Jan. 29, 1952 — W. E. GOBLE — 2,583,830
TRACTOR LIFT DISK HARROW
Filed July 15, 1947 — 2 SHEETS—SHEET 1

INVENTOR:
WILLIAM E. GOBLE
BY
Huebner, Maltby & Beeler
ATTORNEYS.

Jan. 29, 1952 W. E. GOBLE 2,583,830
TRACTOR LIFT DISK HARROW

Filed July 15, 1947 2 SHEETS—SHEET 2

*INVENTOR:—*
WILLIAM E. GOBLE
BY
Huebner, Maltby, + Beeler
ATTORNEYS

Patented Jan. 29, 1952

2,583,830

UNITED STATES PATENT OFFICE 2,583,830

TRACTOR LIFT DISK HARROW

William E. Goble, Fowler, Calif., assignor, by mesne assignments, to The Massey-Harris Company, Racine, Wis.

Application July 15, 1947, Serial No. 761,045

6 Claims. (Cl. 55—73)

The present invention relates to agricultural implements and more particularly to pick-up disc harrows.

In the mechanization of farming, tractors having various types of elevationally positionable tool bars have been provided. It is the practice rigidly to clamp agricultural implements to such tool bars so that elevational positioning of the implements is effected from the tractor through elevational control exercised on the tool bars. This arrangement has been productive of increased efficiency and convenience in cultivating procedures and in the transporting of implements but has been subject to several difficulties. The rigid connecting of a heavy implement to such a tool bar tends to up-end the tractor on which the tool bar is mounted. In implements having considerable length, even a slight rearward tipping of the tractor to which such an implement is attached tends to emphasize the earth engaging effect of the rear portion of the implement. Further, the attitudes of earth working tools employed in such implements remain constant independent of elevational positioning thereof. For example when such implements are raised to decrease their depth of soil engagement, the soil engaging angles of the earth working tools remain in the attitudes pre-adjusted for maximum soil cultivating effect.

An object of my invention is, therefore, to provide an improved agricultural implement of the pick-up type.

Another object is to provide a tractor drawn, compact, agricultural implement automatically folded against the tractor when elevated.

Another object is to provide an elevationally positionable agricultural implement in which lowering and raising thereof is translated into precision adjustment of the attitudes of earth engaging portions thereof.

Another object is to provide a universal disc harrow adapted for ditching, ridging and cultivating purposes.

Another object is to provide a universal disc harrow of the type described adapted to be coupled closely to a draft appliance and characterized by ease of elevational control.

Another object is to provide in a disc harrow having gangs of earth working tools, precision means for angling the gangs in response to elevational positioning of the harrow.

Another object is to provide an agricultural implement in which depth of soil engagement and modification of the soil engaging attitudes of earth working tools borne thereby are positively correlated.

Further objects and advantages will become apparent in the subsequent description in the specification.

Figure 1:
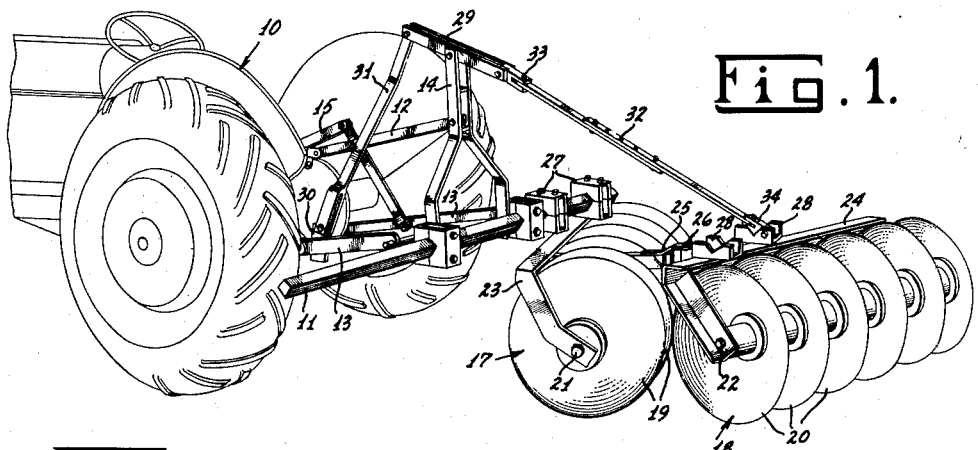
Fig. 1 is a perspective view of a disc harrow, of the present invention in operational relation to a fragmentarily illustrated tractor.
Figure 2:
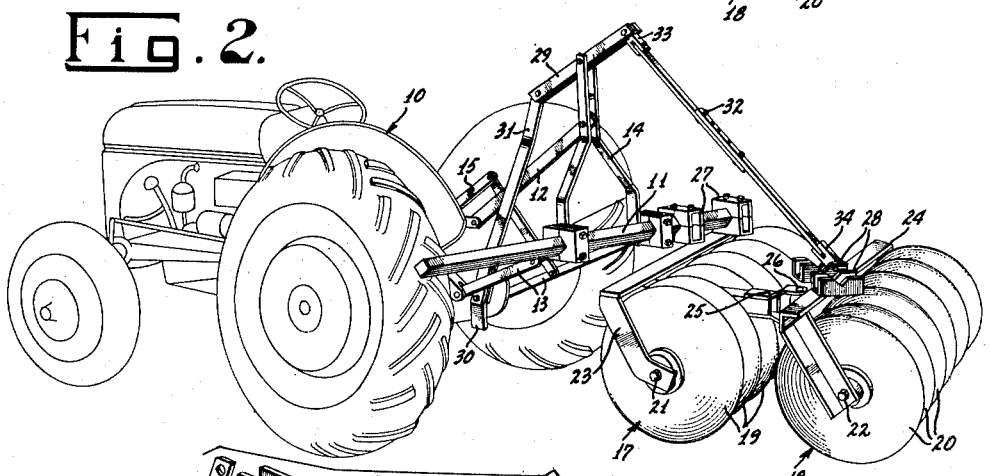
Fig. 2 is a perspective view of the disc harrow of the present invention shown in elevated position in relation to the tractor.

Referring in greater detail to the drawings:

In Figs. 1 and 2, a conventional tractor 10 having an elevationally positionable tool bar 11 is shown. Mounting arms 12 and 13 are pivotally connected to the tractor and rearwardly extended therefrom. An A frame 14 is borne by the rearwardly extended end portions of the mounting arms in a substantially erect position. An actuating means 15 interconnects a source of controlled power of the tractor, not shown, and the mounting arms whereby the A frame is raised and lowered as desired. The tool bar 11 is secured in unitary relation to the A frame by clamps 16, and thus raised and lowered with the A frame. Elevationally positionable tool bars and mountings of the type described are conventional and are usually controlled by hydraulic means. The present invention is not limited to such means of control nor to the structure shown, it being adapted for use with any draft appliance providing an elevationally positionable tool bar.

The disc harrow employs a pair of framed gangs 17 and 18 shown in fore and aft relation, respectively, in Figs. 1 and 2. Oppositely concaved disc blades 19 and 20 are mounted on axles 21 and 22 in spaced relation in support frames 23 and 24. The support frames are preferably constructed to bracket the disc blades and are positioned closely adjacent to the peripheries thereof. A bifurcated arm 25 is rigidly connected to the frame 23 and rearwardly extended therefrom. The bifurcated portion of the arm pivotally mounts the rearward framed gang 18 as at 26 for relative pivotal movement in a substantially horizontal plane. A pair of clamps 27 are secured to the forward framed gang 17 and rigidly connect said gang to the tool bar 11 in rigid angular relation thereto. Similar clamps 28 are connected to the rearward framed gang and, as will presently be more fully described, are adapted to connect the rearward framed gang to the tool bar in side by side relation to the forward gang for ditching and ridging purposes, said clamps being positioned to mount the rearward gang on the tool bar substantially equally and oppositely angled from transverse alignment with the forward gang. It will be clearly apparent that the clamps 27 and 28 may be mounted for angular adjustment on their respective gangs if desired. Further, for lateral offsetting of the discs in towing relation the pivotal connecting of the rearward framed gang to the front gang at 26 may be accomplished at any longitudinal position on the rearward framed gang desired. This may conveniently be accomplished by mounting the bearing shown at 26 on a mounting plate adjustably positioned longitudinally of the rearward framed gang. The adjustable angling of the clamps and the adjustable longitudinal positioning of the bearing 26 are mentioned as conveniences that may be employed. Inasmuch as these clamp and bearing adjustments are not considered to constitute invention they have not been described in greater detail.

Figure 3:
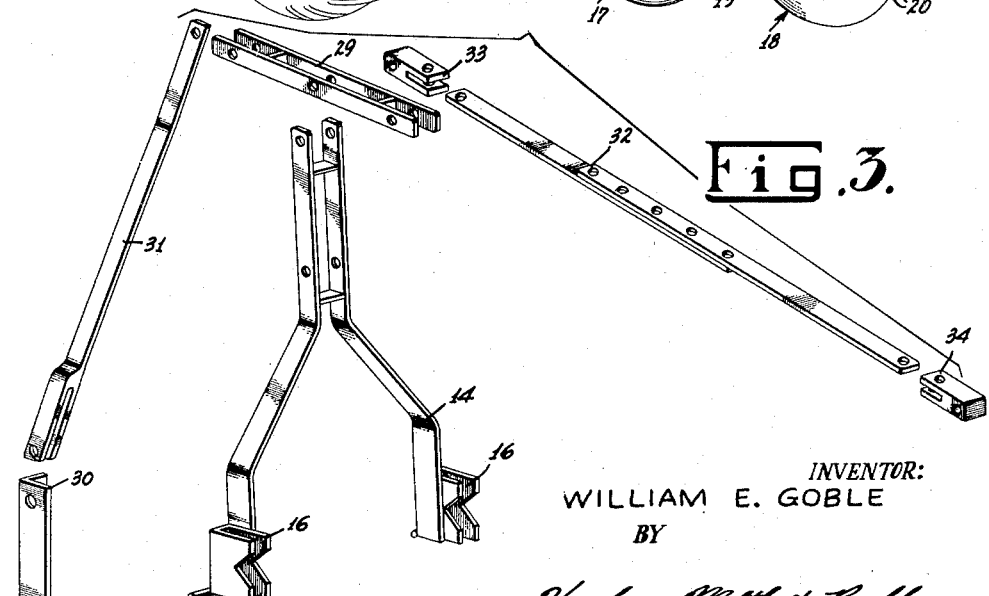
Fig. 3 is an exploded view of elements of the present invention employed to translate elevational positioning of a tractor tool bar into opening and closing of the disc harrow.
Figure 4:
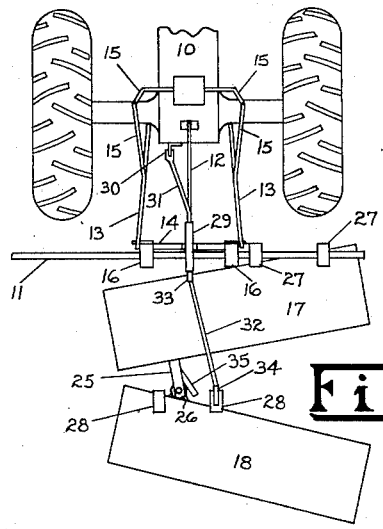
Fig. 4 is a diagrammatic plan view showing the essential parts of the disc harrow of the present invention in angled, working position behind a tractor.
Figure 5:
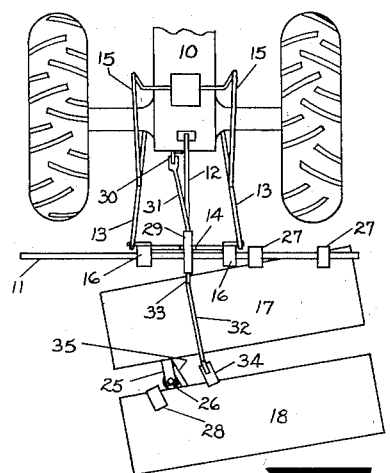
Fig. 5 is a diagrammatic plan view showing said essential parts of the present invention in closed position behind the tractor.

As described, the forward gang is held in cutting relation to earth traversed thereby and both the gangs are raised and lowered by elevational positioning of the tool bar 11. The rearward gang, however, is free for pivotal movement and requires controlled angular adjustment. To this end, a rocker arm 29 is pivotally mounted by the upwardly extended end portion of the A frame. The A frame functions as a fulcrum for the rocker arm and is raised and lowered in unitary relation with the tool bar. A bracket 30 is mounted on a portion of the tractor not affected by elevational positioning of the tool bar 11 thereof. An actuating arm 31 interconnects one end of the rocker arm 29 and the clamp 30 in fixed spacial relation. So arranged, it is clearly apparent that as the A frame 14 and the tool bar 11 are raised and lowered the rocker arm 29 is reciprocally positioned in response thereto. A push-pull rod 32 interconnects the rocker arm at the end thereof opposite the actuating member 31 and the rearward framed gang 18. The push-pull rod is provided with a universal joint 33 at one end connected to the rocker arm and a similar universal joint 34 at the other end connected to one of the clamps 28 on the rearward framed gang. Fig. 4 illustrates the angling of the gangs by the push-pull rod when the disc harrow is lowered. Fig. 5 shows the gangs closed by the push-pull rod resulting from raising the disc harrow. The push-pull rod is preferably adjustable in length, as shown. The actuating arm, A frame, rocker arm, and push-pull rod are shown in exploded relation in Fig. 3 in approximate operating arrangement. To preclude the closing of the gangs beyond a predetermined point, a stop 35 is extended from the arm 25, as shown in Figs. 4 and 5, in a position engageable with the framed gang 18 at the desired closing limit.

Figure 6:
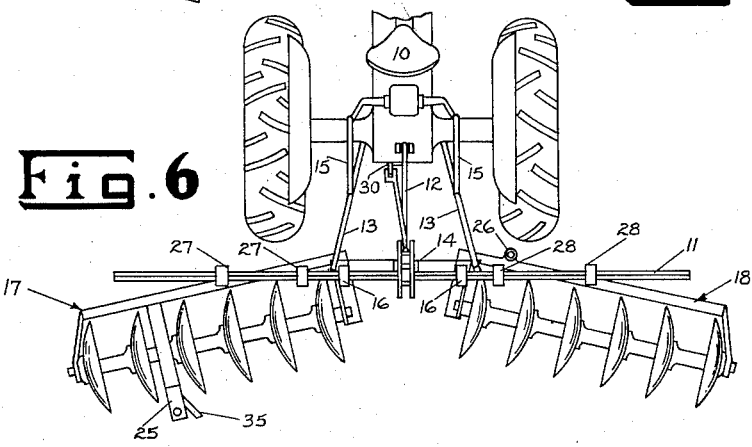
Fig. 6 is a plan view of the disc harrow of the present invention showing gangs thereof in side by side relation as employed for ridging.
Figure 7:
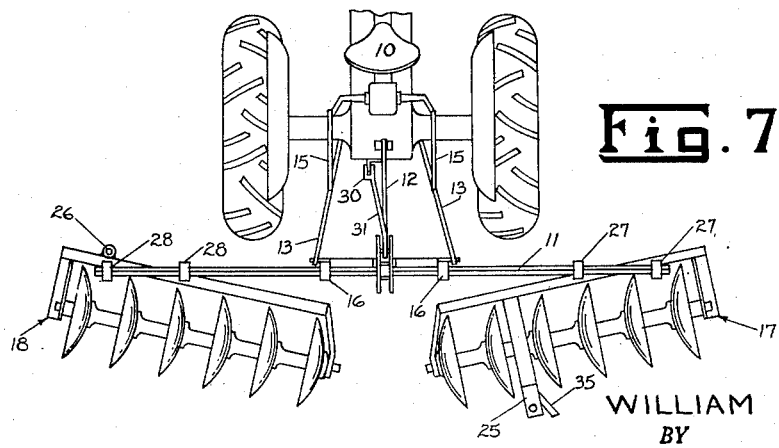
Fig. 7 is a plan view of the disc harrow of the present invention showing the gangs thereof in side by side relation as employed for ditching.

In Figs. 6 and 7, the gangs 17 and 18 are shown directly coupled to the tool bar 11 by means of the clamps 27 and 28, respectively. The gangs are adjustably spaced and interchangeably positioned, as desired, but when so mounted both are maintained in fixed angular relation to the tool bar.

Operation

The operation of the implement of the present invention is apparent in the foregoing description and is briefly summarized at this point.

When the tool bar 11 is lowered, the actuating arm 31 urges its end of the rocker arm 29 upwardly and tips the same rearwardly forcing the push-pull rod 32 rearwardly and opening the gang 18, as shown in Figs. 1 and 4. When the gangs 17 and 18 are lowered to achieve the depth of soil engagement desired, the pre-determined longitudinal adjustment of the push-pull rod 32 determines the relative angular relationship of the gangs in response to elevational positioning, and thus the responsive cutting effect of the disc blades 20.

As the tool bar 11 is raised the implement is elevated for decreased earth engagement or ground clearance, as desired. In elevating the implement, the actuating arm 31 functions to tip the rocker arm 29 forwardly and through the push-pull rod 32 to close the rearward framed gang 18, as shown in Figs. 2 and 5. Not only does the raising and lowering of the tool bar serve elevationally to position the implement of the present invention but said elevational control is translated into precision angling of the rearward framed gang. Thus as the depth of soil engagement is modified, the attitude of the disc blades 20 relative to soil traversed is responsively altered.

To employ the disc harrow of the present invention for ridging, inward plowing, purposes the rearward framed gang 18 is disconnected from the arm 25 at 26 and the universal joint 34 disconnected from the clamp 28. The clamps 28 are then employed to connect the rearward gang in side by side relation with the forward gang oppositely angled from transverse alignment as shown in Fig. 6. To employ the harrow for ditching, outward plowing, the gangs are similarly connected to the tool bar 11 but in inter-changed positions, as shown in Fig. 7. When employed as shown in Figs. 6 and 7 the center of weight of the disc harrow is closely adjacent the tool bar and thus the harrow is raised and lowered with a minimum of inconvenience, the lever arm through which the weight of said harrow operates on the tractor being minimized.

When the gangs 17 and 18 are employed in fore and aft relation for cultivating, as shown in the Figs. 1, 2, 4 and 5; the depth of soil engagement is controlled by raising and lowering the tool bar, the angling of the rearward framed gang controlled in response thereto, and the center of weight of the harrow automatically shifted forwardly by raising the harrow.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices.

Having described my invention, what I claim as new and desire to secure by Letters Patent is:

1. A ground working implement adapted for operation with a draft appliance having an elevationally positionable tool bar, comprising a plurality of gangs of earthworking tools in fore and aft arrangement, means interconnecting the gangs for relative angling movement in a horizontal plane, means rigidly connecting the forward gang to the tool bar, and thrust means interconnecting the draft appliance and the rearward gang and translating depressing of the tool bar into forcible rearward angling of the rearward gang.

2. An agricultural implement adapted for use with a tractor having an elevationally positionable tool bar comprising a gang of earthworking tools rigidly attached to the tool bar, in predetermined angular relation thereto, a second gang of earth working tools pivotally connected to the first gang for relative angular movement, a fulcrum member raised and lowered with the tool bar, a rocker arm borne by the fulcrum and connected to the tractor for pivotal movement in response to elevational positioning of the tool bar relative to the tractor, and rigid thrust means interconnecting the rocker arm and the second gang whereby elevational positioning of the tool bar elevationally positions the implement and in response thereto controllably angles the second gang.

3. In combination with an elevationally positionable draft hitch borne by a draft appliance, forward and rearward ground engaging members, means interconnecting the ground engaging members for substantially horizontal pivotal movement, means mounting the forward member on the draft hitch for unitary elevational movement of the members with the hitch, a rocker arm pivotally mounted intermediate its end portions on the draft hitch, means pivotally interconnecting an end portion of the rocker arm and the draft appliance in fixed spaced relation, and means interconnecting the opposite end portion of the rocker arm and the rearward ground engaging member in predetermined spaced relation at a position removed from the pivotal interconnection of the members.

4. An agricultural implement adapted for use with a draft appliance having an elevationally positionable draft hitch comprising forward and rearward gangs of earth working tools, clamps interconnecting the forward gang and the draft hitch for corresponding elevational movement, pivot means interconnecting the gangs for relative horizontal pivotal movement and corresponding elevational movement, a rocker arm pivotally mounted in the draft hitch and having a forward end portion forwardly extended above the draft appliance and a rearward end portion rearwardly extended above the gangs, an actuating arm interconnecting the forward end portion of the rocker arm and a position on the draft appliance therebelow in fixed spaced relation, and a substantially rigid member interconnecting the rearward end portion of the rocker arm and the rearward gang in predetermined spaced relation at a position removed from the pivotal interconnection of the gangs.

5. In a hitch for coupling an agricultural implement having forward and rearward ground engaging members to a draft appliance having rear support wheels and a rearwardly extended elevationally positionable draft hitch, the combination of means interconnecting the ground engaging members for substantially horizontal relative pivotal movement, clamps interconnecting the forward ground engaging member and the draft hitch for corresponding elevational movement, a rocker arm pivotally mounted intermediate its end portions for unitary elevational movement with the draft hitch, an operating lever pivotally interconnecting an end portion of the rocker arm and a position on the draft appliance rearward of the rear support wheels thereof, and a substantially rigid push-pull member pivotally interconnecting the opposite end portion of the rocker arm and the rearward ground engaging member at a position removed from the pivotal interconnection of the ground engaging members.

6. In a hitch for coupling an agricultural implement having pivotally interconnected forward and rearward framed gangs of earth working tools to a draft appliance having a rearwardly extended elevationally positionable draft hitch rigidly connected to the forward gang, the combination of a rocker arm pivotally mounted on the draft hitch and having an end portion forwardly extended above the draft appliance and an opposite end rearwardly extended above the implement, an operating member interconnecting the forward end of the rocker arm and a position on the draft appliance therebelow in fixed spaced relation, and a rigid, telescopically adjustable push-pull member interconnecting the rearward end of the rocker arm and the rearward gang at a position removed from the pivotal interconnection of the gangs in adjustably spaced relation.

WILLIAM E. GOBLE.

REFERENCES CITED

The following references are of record in the file of this patent:

UNITED STATES PATENTS

| Number | Name | Date |
|---|---|---|
| 2,247,534 | Von Schlegell | July 1, 1941 |
| 2,336,410 | McKay | Dec. 7, 1943 |
| 2,337,801 | Cook | Dec. 28, 1943 |
| 2,341,807 | Olmstead et al. | Feb. 15, 1944 |
| 2,344,301 | Hand | Mar. 14, 1944 |
| 2,413,807 | Warne | Jan. 7, 1947 |
| 2,414,114 | Martin | Jan. 14, 1947 |
| 2,430,732 | Orelind et al. | Nov. 11, 1947 |